United States Patent
Bai et al.

(10) Patent No.: US 10,989,576 B1
(45) Date of Patent: Apr. 27, 2021

(54) METHOD AND SYSTEM FOR OBTAINING MICRO-NANO LEVEL FRACTURE MODEL AND EVALUATING PLUGGING PERFORMANCE OF DRILLING FLUID

(71) Applicant: Southwest Petroleum University, Sichuan (CN)

(72) Inventors: Yang Bai, Sichuan (CN); Yan Cheng, Sichuan (CN); Pingya Luo, Sichuan (CN); Hongbo Li, Sichuan (CN); Cheng Li, Sichuan (CN); Hao Zhang, Sichuan (CN); Guojun Li, Sichuan (CN); Dezhi Liu, Sichuan (CN); Chunyan Liu, Sichuan (CN)

(73) Assignee: Southwest Petroleum University, Sichuan (CN)

( * ) Notice: Subject to any disclaimer, the term of this patent is extended or adjusted under 35 U.S.C. 154(b) by 0 days.

(21) Appl. No.: 16/844,499

(22) Filed: Apr. 9, 2020

(30) Foreign Application Priority Data

Jan. 17, 2020 (CN) .......................... 202010054631.7

(51) Int. Cl.
*G01F 1/34* (2006.01)
*G01F 1/88* (2006.01)
*G01F 23/14* (2006.01)
*G01F 1/36* (2006.01)
*G01F 22/02* (2006.01)

(52) U.S. Cl.
CPC .................. *G01F 1/34* (2013.01); *G01F 1/36* (2013.01); *G01F 1/88* (2013.01); *G01F 23/14* (2013.01); *G01F 22/02* (2013.01)

(58) Field of Classification Search
CPC ........... G01N 15/0826; G01N 15/0806; G01N 15/082; G01N 11/08; G01F 1/36
See application file for complete search history.

(56) References Cited

U.S. PATENT DOCUMENTS

| 4,304,122 A | * | 12/1981 | Tentor | ................ G01N 15/0826 |
| | | | | 73/152.07 |
| 10,161,891 B1 | * | 12/2018 | Tian | ........................ E21B 49/02 |
| 2018/0372611 A1 | * | 12/2018 | Yue | ........................ E21B 49/025 |

* cited by examiner

*Primary Examiner* — Michael J Dalbo
(74) *Attorney, Agent, or Firm* — Maine Cernota & Rardin

(57) ABSTRACT

The invention discloses a method and system for obtaining an evaluation model and an evaluation method and system for the plugging performance of drilling fluid. The method for obtaining the evaluation model comprises: applying a confining pressure to a holding device where a preset fracture model is located, wherein a displacement differential pressure of two ends of the holding device is a preset displacement differential pressure; measuring a flow of standard measuring fluid flowing through the preset fracture model under different confining pressures, wherein the different confining pressures gradually increase according to a first preset rule; and controlling to stop increasing the confining pressure when the flow of the standard measuring fluid flowing through the preset fracture model reaches a preset flow so as to compress the preset fracture model into the evaluation model at a micro-nano level.

11 Claims, 4 Drawing Sheets

METHOD AND SYSTEM FOR OBTAINING MICRO-NANO LEVEL FRACTURE MODEL AND EVALUATING PLUGGING PERFORMANCE OF DRILLING FLUID

RELATED APPLICATIONS

This application claims the benefit of Chinese Patent Application No. 202010054631.7, filed Jan. 17, 2020, entitled "Method and System for Obtaining Evaluation Model, and Evaluation Method and Evaluation System" which is incorporated by reference as if fully set forth herein.

FIELD OF THE INVENTION

The invention relates to the technical field of well drilling, in particular to a method and system for obtaining an evaluation model, and a method and system for evaluation of the plugging performance of drilling fluid.

BACKGROUND OF THE INVENTION

Wellhole instability is a serious engineering difficulty troubling the drilling field for years, which needs to be solved urgently, yet without being solved well. Wellhole instability will cause borehole collapse, drill pipe sticking, circulation loss, and other complicated downhole situations which seriously affect the drilling quality and progress. Wellhole instability of a formation mainly occurs at a shale formation comprising a fracture, and closed or open bedding and micro fractures mostly exist at the formation, and the capillary action force of the fractures is strong. Under the effect of a positive differential pressure of the formation and a capillary pressure of fractures, it is easy for drilling fluid to invade into the formation, thereby causing shale to fracture along a fracture surface or a bedding surface and to continuously develop longitudinally and horizontally along the fracture surface, thus aggravating the wellhole instability phenomenon. For the wellhole instability of the formation, a pressure transmission process caused by invasion of borehole fluid into the formation can be effectively obstructed only by adding a plugging material into the drilling fluid, filling the fracture and forming a blocking layer on a borehole wall, so as to achieve the purpose of stabilizing the borehole.

For the shale and other formations with developed micro fractures, related researchers proposed a method for effective plugging in a targeted manner by adding nano-level particles into the drilling fluid. However, in the field of drilling fluid, available nano plugging agent products are mostly nanoemulsions, super-fine calcium carbonate, nano silicon dioxide, and the like. (Since these products have stable performance and the effects in drilling fluid are prominent, these products have been applied to a part of well sites in some regions.) However, with continuous promotion and application of nano plugging agent products, the defects of the evaluation method on the plugging effect of the nano plugging agent products also become prominent.

At present, the methods related to evaluation of the plugging effects of nanoparticles which are being studied and used in the field of drilling fluid mainly comprise: a high pressure filtration loss measurement method, a high pressure mud cake permeability experiment (high pressure permeability filtration loss experiment), a scanning electron microscope observation method, a sound wave propagation rate measurement method, a permeability plugging experiment, a mud cake strength scouring experiment and a pressure transmission experiment etc. These methods play a certain role in evaluating the plugging effect, but whether they can authentically reflect the plugging effect of nanoparticles on micro fractures of clay-shale also needs to be further verified through experiments. The inventors pointed out: when a nano plugging agent is added into base slurry and is evaluated by a high pressure filtration loss measurement method, no influence on high pressure filtration loss and filtration rate is generated substantially; therefore, the plugging effect of nanoparticles cannot be effectively reflected, and with a mud cake evaluation method, the plugging effect of nanoparticles can be reflected only after an outer mud cake is formed by filling filter paper pores with micron-sized plugging materials. Thus, the above evaluation methods are not highly operable and cannot effectively reflect the plugging effect of nanoparticles.

In addition, the inventors made an analysis, holding that although the evaluation methods like high temperature and high pressure filtration loss, high temperature and high pressure sand bed, permeability plugging, and other drilling fluid plugging capacities, which are conventionally used currently, are convenient to operate and can directly reflect the difference of performance of plugging agents, the width of the simulated fracture is generally around 50 micrometers. Thus, the above methods cannot be used for simulating micro- and nano-sized fractures/pores of shale reservoir, so that the preferred plugging materials selected are unable to satisfy requirements of borehole stability of tight oil reservoirs, thus generating the problem of wellhole instability occurring in a drilling process.

SUMMARY OF THE INVENTION

The invention aims to provide a method and system for obtaining an evaluation model and a method and system for evaluation of the plugging performance of drilling fluid, and through the method and system for obtaining the evaluation model, an evaluation model at a micro-nano level can be repetitively prepared. The evaluation model is completely applicable to evaluation of the plugging of drilling fluid of a micro-nano shale formation. The experiment of the above evaluation features low operation difficulty, low cost, and highly accurate evaluation results.

In order to realize the above purposes, a first aspect of the invention provides a method for obtaining an evaluation model, the method comprising: applying a confining pressure to a holding device where a preset fracture model is located, wherein a displacement differential pressure of two ends of the holding device is a preset displacement differential pressure; measuring a flow of standard measuring fluid flowing through the preset fracture model under different confining pressures, wherein the different confining pressures gradually increase according to a first preset rule; and controlling to stop increasing the confining pressure when the flow of the standard measuring fluid flowing through the preset fracture model reaches a preset flow, so as to compress the preset fracture model into the evaluation model at a micro-nano level.

Optionally, the preset fracture model is obtained by the following steps: establishing a three-dimensional model of a cylinder having a connected fracture; compiling the three-dimensional model; and performing 3D printing on the compiled three-dimensional model to obtain the preset fracture model.

Optionally, the preset fracture model is a single-connected fracture model or a multi-connected fracture model.

Optionally, the method further comprises: determining an average permeability of the evaluation model for specific drilling fluid containing a specific plugging material according to a Darcy formula, a Poiseuille's plate flow infinitesimal analysis formula and the preset flow when the preset fracture model is the single-connected fracture model; or determining an average permeability of the evaluation model for specific drilling fluid containing a specific plugging material according to a Darcy formula and the preset flow when the preset fracture model is the multi-connected fracture model.

Optionally, the method further comprises: determining the size of a fracture in the single-connected fracture model according to a Poiseuille's plate flow infinitesimal analysis formula and the preset flow when the preset fracture model is the single-connected fracture model.

Optionally, the method further comprises: determining a confining pressure when increasing the confining pressure is stopped as a confining pressure threshold; and storing the confining pressure threshold. Through the above technical solution, the invention creatively comprises the following steps: the flow of the standard measuring fluid flowing through the preset fracture model is measured under the preset displacement differential pressure, by adjusting the confining pressure applied to the holding device where the preset fracture model is located; and when it is detected that the flow of the standard measuring fluid flowing through the preset fracture model reaches the preset flow, it is indicated that the preset fracture model has been compressed into the evaluation model at a micro-nano level. Thus, the evaluation model at a micro-nano level can be prepared repetitively and the evaluation model is completely applicable to evaluation of the plugging of drilling fluid of a micro-nano shale formation. The experiment of the above evaluation features low operation difficulty, low cost, and highly accurate evaluation results.

A second aspect of the invention provides an evaluation method for the plugging performance of drilling fluid, the evaluation method comprising: applying a displacement differential pressure to two ends of a holding device where a preset fracture model is located when a confining pressure threshold obtained according to the method for obtaining the evaluation model is applied to the holding device; measuring a flow of specific drilling fluid flowing through the preset fracture model under different displacement differential pressures, wherein the different displacement differential pressures gradually increase according to a second preset rule and the specific drilling fluid contains a specific plugging material; recording a current displacement differential pressure when the flow of the specific drilling fluid flowing through the preset fracture model exceeds a preset flow increment; and comparing the current displacement differential pressure with displacement differential pressure thresholds corresponding to the specific drilling fluid having different levels of plugging performance to determine the plugging level of the drilling fluid.

Optionally, the different displacement differential pressures gradually increase according to a second preset rule comprising: the different displacement differential pressures gradually increase according to a preset displacement differential pressure increment.

Through the above technical solution, the invention creatively comprises the following steps: the flow of the specific drilling fluid flowing through the preset fracture model is measured under the confining pressure threshold by gradually increasing the displacement differential pressure applied to two ends of the holding device where the preset fracture model is located; and when it is detected that the flow of the specific drilling fluid flowing through the preset fracture model exceeds the preset flow increment, it is indicated that the specific drilling fluid leaks largely or the evaluation model is punctured (that is, the specific drilling fluid loses plugging capability). Thus, the evaluation model is completely applicable to evaluation of the plugging of drilling fluid of a micro-nano shale formation. The experiment of the above evaluation features low operation difficulty, low cost, and highly accurate evaluation results.

A third aspect of the invention provides a system for obtaining an evaluation model, the system comprising: a confining pressure applying device for applying a confining pressure to a holding device where a preset fracture model is located, wherein a displacement differential pressure of two ends of the holding device is a preset displacement differential pressure; a first flow measuring device for measuring a flow of standard measuring fluid flowing through the preset fracture model under different confining pressures, wherein the different confining pressures gradually increase according to a first preset rule; and a controlling device for controlling to stop increasing the confining pressure when the flow of the standard measuring fluid flowing through the preset fracture model reaches a preset flow, so as to compress the preset fracture model into the evaluation model at a micro-nano level.

Optionally, a material of the preset fracture model is at least one of glass fiber reinforced polyamide, acrylonitrile-butadiene-styrene copolymer, and thermoplastic polyurethane.

Optionally, the system further comprises: a confining pressure obtaining device for determining a confining pressure when increasing the confining pressure is stopped as a confining pressure threshold; and a storing device for storing the confining pressure threshold.

The specific details and advantages of the system for obtaining the evaluation model provided by the invention refer to the above description about the method for obtaining the evaluation model. No more description is made herein.

A fourth aspect of the invention provides an evaluation system for the plugging performance of drilling fluid, the evaluation system comprising: a differential pressure applying device for applying a displacement differential pressure to two ends of a holding device where a preset fracture model is located when a confining pressure threshold obtained according to the system for obtaining the evaluation model is applied to the holding device; a second flow measuring device for measuring a flow of specific drilling fluid flowing through the preset fracture model under different displacement differential pressures, wherein the different displacement differential pressures gradually increase according to a second preset rule, and the specific drilling fluid contains a specific plugging material; a recording device for recording a current displacement differential pressure when the flow of the specific drilling fluid flowing through the preset fracture model exceeds a preset flow increment; and a level determining device for comparing the current displacement differential pressure with displacement differential pressure thresholds corresponding to the specific drilling fluid having different levels of plugging performance to determine the plugging level of the specific drilling fluid.

The specific details and advantages of the system for evaluation of the plugging performance of drilling fluid provided by the invention refer to the above description about the evaluation method for the plugging performance of drilling fluid. No more description is made herein.

Other features and advantages of the invention will be described in details in the subsequent part of specific implementations in details.

The features and advantages described herein are not all-inclusive and many additional features and advantages will be apparent to one of ordinary skill in the art in view of the drawings, specification, and claims. Moreover, it should be noted that the language used in the specification has been principally selected for readability and instructional purposes and not to limit the scope of the inventive subject matter.

BRIEF DESCRIPTION OF THE DRAWINGS

The accompanying drawings are used to provide a further understanding of the invention and constitute a part of the description. The accompanying drawings together with the specific implementations below are used to explain the invention, but do not constitute a limitation to the invention. In the drawings.

DESCRIPTION OF REFERENCE NUMBERS IN THE DRAWINGS

| 10 Confining pressure applying device | 20 First flow measuring device |
|---|---|
| 30 Controlling device | 40 Differential pressure applying device |
| 50 Second flow measuring device | 60 Recording device |
| 70 Level determining device | |

DETAILED DESCRIPTION

The specific embodiments of the present invention will be described in detail below in combination with the accompanying drawings. It should be understood that the embodiments described herein are merely used for describing and explaining the invention and are used for restricting the invention.

Figure 1:
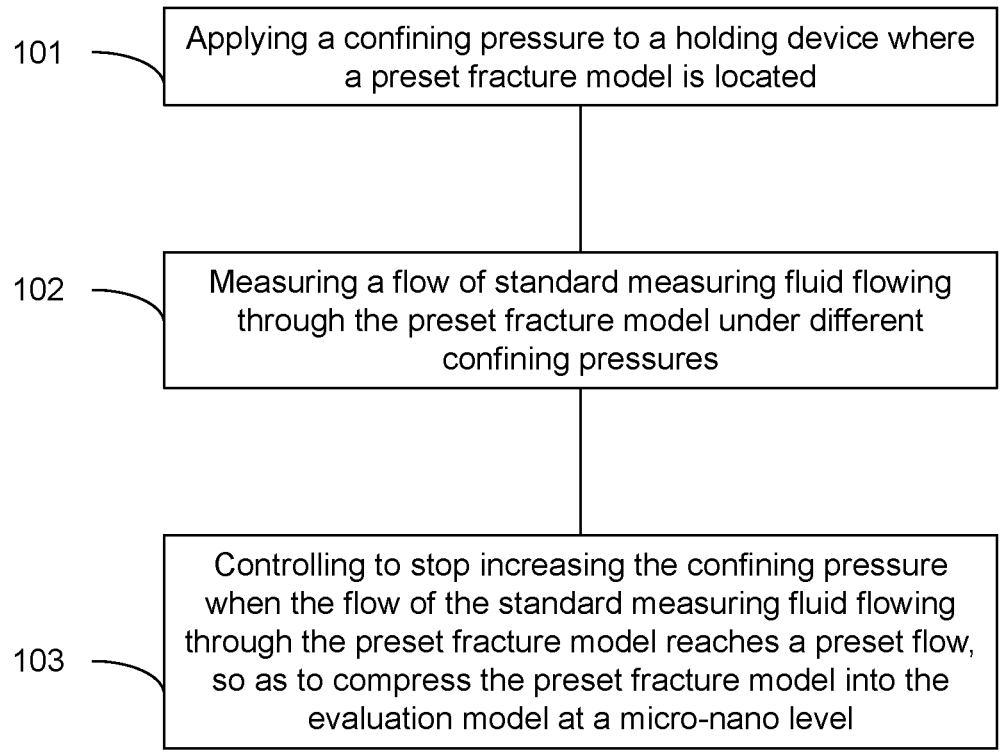
FIG. 1 is a flow chart of a method for obtaining an evaluation model provided by one embodiment of the invention.

FIG. 1 is a flow chart of a method for obtaining an evaluation model provided by one embodiment of the invention. As shown in FIG. 1, the method for obtaining the evaluation model comprises: step 101, applying a confining pressure to a holding device where a preset fracture model is located, wherein a displacement differential pressure of two ends of the holding device is a preset displacement differential pressure; step 102, measuring the flow of standard measuring fluid flowing through the preset fracture model under different confining pressures, wherein the different confining pressures gradually increase according to a first preset rule; and step 103, controlling to stop increasing the confining pressure when the flow of the standard measuring fluid flowing through the preset fracture model reaches a preset flow so as to compress the preset fracture model into the evaluation model at a micro-nano level.

The preset fracture model can be obtained by: establishing a three-dimensional model of a cylinder having a connected fracture; compiling the three-dimensional model; and performing three-dimensional (3D) printing on the compiled three-dimensional model to obtain the preset fracture model.

Specifically, in one embodiment, by using Rhino software, a cylinder (the height of the cylinder can be 50 mm and the basal diameter of the cylinder can be 25 mm) having a connected fracture of 5-20 mm in length, 1 mm in width and 50 mm in height is established; the three-dimensional model (e.g. in the stereolithography (STL) format) is exported (at this time, the specific situation of the connected fracture and the cylinder can be checked through 3D view software) and then compilation processing is performed by using slice software Cura; the compiled Gcode file is stored in a USB flash disk, and then the USB flash disk is plugged into a printing machine (e.g. German RepRap X1000 printer); the printing material is placed in the printing machine; the compiled Gcode file in the USB flash disk is selected, the printing temperature of the machine is set to be 90-230° C. (preferably 210° C.), the printing rate is set to be 20-150 mm/s (preferably 60 mm/s), and automatic printing is started to obtain a preset fracture model (i.e. 3D printing model).

In another embodiment, the micro topographical characteristic of a fracture at a drill core is obtained firstly through CT scanning and other measures. Then, a digital drill core is adopted for modeling. Later, 3D printing is directly performed on the model.

Wherein a material (or a printing material) of the preset fracture model can be at least one of glass fiber reinforced polyamide, acrylonitrile-butadiene-styrene copolymer, and thermoplastic polyurethane. Preferably, a material of the preset fracture model can be thermoplastic polyurethane.

Since the width of a fracture of a finished product of a 3D printing model is caused to be 1 mm by printing accuracy and other reasons, and it is very difficult to satisfy the requirement on the size of a micro-nano fracture of the shale formation, thus adopting the method of applying a confining pressure in the embodiment enables a connected fracture of the 3D printing model to reach the requirements.

Specifically, first of all, a drill core holder, a constant-flux pump, and a confining pressure pump are connected, and a measuring cylinder is placed at a water outlet end of the holder for measuring. Next, the 3D printing model to be measured is placed into the drill core holder, and the water inlet pipe of the holder is placed into a beaker filled with 500 mL of distilled water. Then, a stable displacement differential pressure (e.g. ΔP is 0.9 Mpa) is applied to two ends of the holder through the constant-flux pump, and an initial confining pressure (e.g. 5 MPa) is applied to the holder through the confining pressure pump. Furthermore, the confining pressure is increased by 0.5 MPa, and the flow of distilled water in the measuring cylinder is recorded after the pressure is stabilized. The procedure is repeated. In the case of continuously increasing the confining pressure, the connected fracture in the 3D printing model gradually shrinks. Therefore, the flow under the corresponding confining pressure is reduced as well, and the flow of distilled water flowing through the 3D printing model under different confining pressures is measured and recorded. Finally, when the flow of distilled water flowing through the preset fracture model under a certain preset confining pressure (e.g. 10 MPa) is as low as a preset flow Q0, it is indicated that the connected fracture of the 3D printing model reaches a micro-nano level. Thus, stopping of increasing the confining pressure can be controlled.

Of course, the different confining pressures gradually increase according to a first preset rule, comprising but not limited to the different confining pressures gradually increase according to a fixed value (0.5 MPa) as mentioned above, and further comprises the different confining pressures gradually increase according to other reasonable rules (e.g. the different confining pressures gradually increase according to a greater fixed increment at an initial stage and later gradually increase according to a smaller fixed increment or unfixed increment, thus a more accurate confining pressure threshold can be obtained).

The method for obtaining the evaluation model can further comprise: determining a confining pressure when increasing the confining pressure is stopped as a confining pressure threshold and storing the confining pressure threshold (e.g. 10 MPa). Thus, under the same condition, the width of the fracture at a micro-nano level can be realized by adjusting the applied confining pressure to the confining pressure threshold, and at the same time, the corresponding confining pressure when the width of the fracture is made to reach the micro-nano level is quantified. In the embodiment of further plugging evaluation, a preferred confining pressure threshold can be selected for the experiment, thereby making specific drilling fluid for the evaluation experiment perform plugging operation on the condition that the width of the fracture completely satisfies the required micro-nano size.

Wherein the preset fracture model can be a single-connected fracture model (can be referred to as a single-fracture model in short) or a multi-connected fracture model (can be referred to as a multi-fracture model in short). Wherein the specific drilling fluid can comprise: water-based or oil-based drilling fluid of at least one of micro-nano plugging materials containing super-fine calcium carbonate, nanoemulsions, emulsion paraffin, and the like.

For the single-fracture model, the average permeability K thereof can be obtained by using the Darcy formula:

$$K = \frac{W_s^2}{12}, \quad (1)$$

According to the Poiseuille's plate flow infinitesimal analysis formula, the relationship between the flow and the single-fracture size can be obtained:

$$Q_0 = \frac{(W_b \bullet W_s)^3 \Delta P}{12 \mu L}, \quad (2)$$

wherein $W_b$ is a single-fracture horizontal length (or length in short) (cm); $W_s$ is a single-fracture width (cm); $\Delta P$ is a differential pressure (pa) between the inlet and the outlet of the holding device; L is a single-fracture longitudinal length (or height in short) (cm); and $\mu$ is viscosity (mPa·s) of fluid.

According to the above formulas (1) and (2) and a preset flow $Q_0$, the average permeability $K_1$ of the single-fracture model can be obtained through calculation. Thus, the purpose of presetting the average permeability of the single fracture can be realized by adjusting the applied confining pressure to the confining pressure threshold.

In addition, the method for obtaining the evaluation model can further comprise: determining the size of a fracture in the single-connected fracture model according to the Poiseuille's plate flow infinitesimal analysis formula and the preset flow when the preset fracture model is a single-connected fracture model. Specifically, according to the above formula (2) and the preset flow $Q_0$, the specific size of the single-fracture fracture can be obtained through calculation when the applied confining pressure reaches the confining pressure threshold (in this case, the single-fracture horizontal length can be approximately seen as the single-fracture width), thus accurate control over the width of the fracture of the evaluation model can be realized.

For the multi-fracture model, the average permeability K thereof can be obtained by using the Darcy formula:

$$K = \frac{Q \mu L}{A \Delta P}, \quad (3)$$

Wherein A is the total area (cm$^2$) of a multi-fracture cross section; $\Delta P$ is a differential pressure (pa) between the inlet and the outlet of the holding device; L is a multi-fracture longitudinal length (or height in short) (cm); and $\mu$ is viscosity (mPa·s) of fluid.

According to the above formula (3) and a preset flow $Q_0$, the average permeability $$K_2 = \frac{Q_0 \mu L}{A \Delta P}$$

of the multi-fracture model can be obtained. Thus, the purpose of presetting the average permeability of multiple fractures can be realized by adjusting the confining pressure applied to the holding device to the confining pressure threshold.

To sum up, the invention creatively comprises the following steps: the flow of the standard measuring fluid flowing through the preset fracture model is measured under the preset displacement differential pressure by adjusting the confining pressure applied to the holding device where the preset fracture model is located; when it is detected that the flow of the standard measuring fluid flowing through the preset fracture model reaches the preset flow, it is indicated that the preset fracture model has been compressed into the evaluation model at a micro-nano level. Thus, the evaluation model at a micro-nano level can be prepared repetitively. The evaluation model is completely applicable to evaluation of the plugging of drilling fluid of a micro-nano shale formation. The experiment of the above evaluation features low operation difficulty, low cost, and highly accurate evaluation results.

Figure 2:
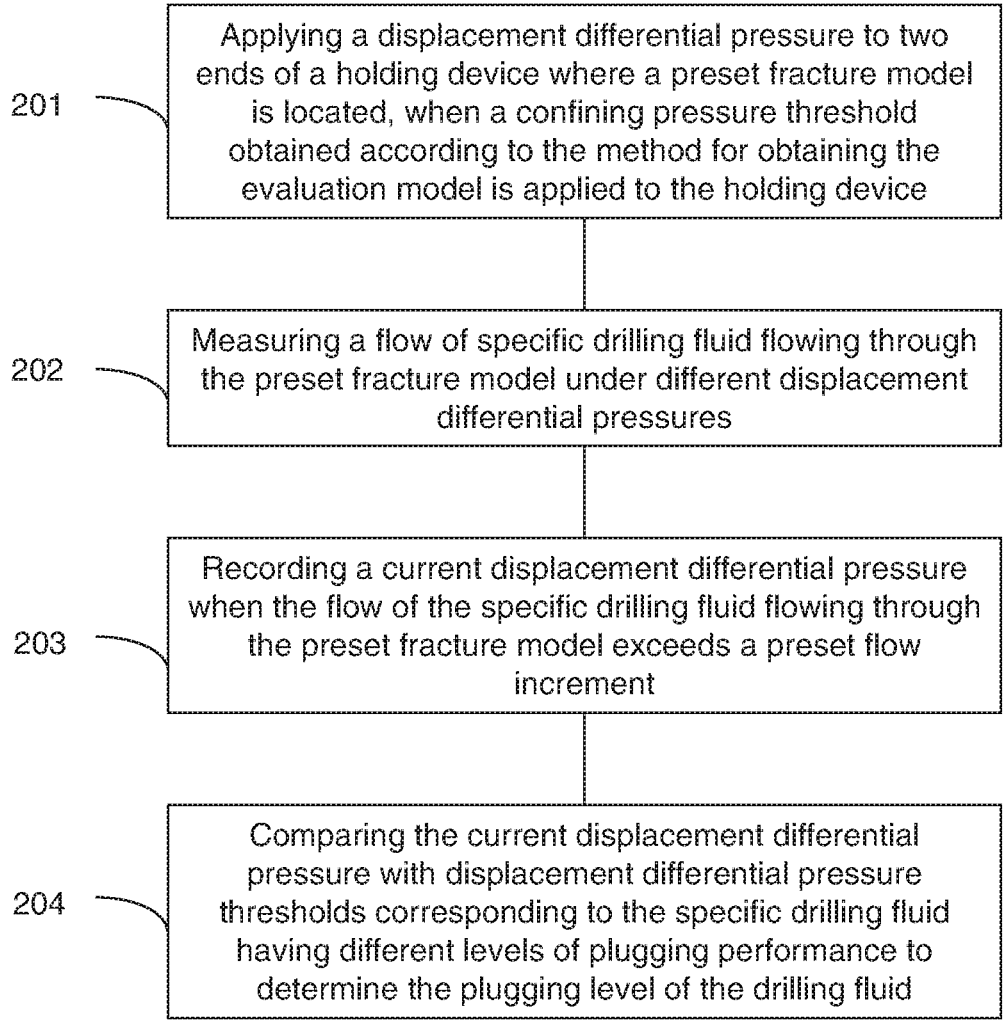
FIG. 2 is a flow chart of an evaluation method for the plugging performance of drilling fluid provided by one embodiment of the invention.

FIG. 2 is a flow chart of a method for evaluating the plugging performance of drilling fluid provided by one embodiment of the invention. As shown in FIG. 2, the method for evaluating the plugging performance of drilling fluid can comprise: step 201, applying a displacement differential pressure to two ends of a holding device where a preset fracture model is located when the confining pressure threshold obtained according to the method for obtaining the evaluation model is applied to the holding device; step 202, measuring the flow of specific drilling fluid flowing through the preset fracture model under different displacement differential pressures, wherein the different displacement differential pressures gradually increase according to a second preset rule and the specific drilling fluid contains a specific plugging material; step 203, recording the current displacement differential pressure when the flow of the specific drilling fluid flowing through the preset fracture model exceeds a preset flow increment; and step 204, comparing the current displacement differential pressure with displacement differential pressure thresholds corresponding to the specific drilling fluid having different levels of plugging performance, to determine the plugging level of the drilling fluid.

Wherein the different displacement differential pressures gradually increase according to a second preset rule, comprising: the different displacement differential pressures gradually increase according to a preset displacement differential pressure increment. Of course, the different displacement differential pressures gradually increase according to a second preset rule comprising but not limited to: the different displacement differential pressures gradually increase according to a fixed value (e.g. 1 MPa) as mentioned above and the different displacement differential pressures gradually increase according to other reasonable rules (e.g. gradually increase according to a greater fixed increment at an initial stage, and later gradually increase according to a smaller fixed increment or unfixed increment, thus a more accurate displacement differential pressure can be obtained).

Specifically, the specific confining pressure threshold (e.g. 10 MPa) obtained above is selected as a fixed confining pressure in the plugging evaluation experiment. During the experiment, the 3D printing model to be measured is placed into the drill core holder, and the water inlet pipe of the holder is placed into a beaker filled with specific drilling fluid (containing a specific plugging material). Applying the fixed confining pressure to the (drill core) holder where the evaluation model is placed can make the fracture of the evaluation model reach the micro-nano level. Parameters (comprising the highest displacement pressure $P_H$, the lowest displacement pressure $P_L$, and flow rate F as 1 mL/m) of the constant-flux pump are set in advance and the differential pressure (i.e. the initial displacement differential pressure) $\Delta P_0$ of two ends of the holder is set as 1 MPa (at this time, the highest displacement pressure $P_H$ is 1 MPa and the lowest displacement pressure $P_L$ is 0.99 MPa), for waiting for the leakage of the specific drilling fluid, and the amount of leakage under the displacement differential pressure is recorded when the specific drilling fluid stops leaking. The displacement differential pressure is continuously increased by 1 MPa (i.e. the displacement differential pressure 2 MPa is applied, and at this time the highest displacement pressure $P_H$ is 2 MPa and the lowest displacement differential pressure $P_L$ is 1.99 MPa) and the procedure of the step is repeated continuously until the amount of leakage under a certain displacement differential pressure exceeds a preset flow increment, it is indicated that the specific drilling fluid leaks largely (or the fracture at the micro-nano level width in the evaluation model is punctured by the displacement differential pressure), and the specific drilling fluid loses the plugging performance. At this time, the current displacement differential pressure is recorded. Next, the current displacement differential pressure is compared with displacement differential pressure thresholds corresponding to the specific drilling fluid having different levels of plugging performance, and if the current displacement differential pressure is equal to a displacement differential pressure threshold corresponding to the same specific drilling fluid having a specific level of plugging performance (e.g. level A), the plugging level of the drilling fluid is determined as the specific level (e.g. level A).

To sum up, the invention creatively comprises the following steps: the flow of the specific drilling fluid flowing through the preset fracture model is measured under the confining pressure threshold by gradually increasing the displacement differential pressure applied to two ends of the holding device where the preset fracture model is located; and when it is detected that the flow of the specific drilling fluid flowing through the preset fracture model exceeds the preset flow increment, it is indicated that the specific drilling fluid leaks largely or the evaluation model is punctured (that is, the specific drilling fluid loses the plugging capability). Thus, the evaluation model is completely applicable to evaluation of the plugging of drilling fluid of a micro-nano shale formation. The experiment of the above evaluation features low operation difficulty, low cost, and highly accurate evaluation results.

Figure 3:
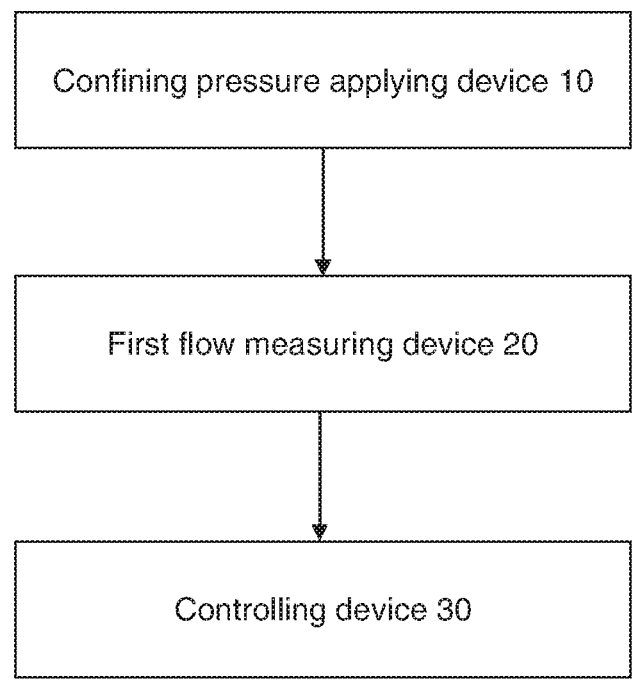
FIG. 3 is a structure diagram of a system for obtaining an evaluation model provided by one embodiment of the invention.

FIG. 3 is a structure diagram of a system for obtaining an evaluation model provided by one embodiment of the invention. As shown in FIG. 3, the system for obtaining the evaluation model can comprise: a confining pressure applying device 10, for applying a confining pressure to a holding device where a preset fracture model is located, wherein a displacement differential pressure of two ends of the holding device is a preset displacement differential pressure; a first flow measuring device 20, for measuring the flow of standard measuring fluid flowing through the preset fracture model under different confining pressures, wherein the different confining pressures gradually increase according to a first preset rule; and a controlling device 30, for controlling to stop increasing the confining pressure when the flow of the standard measuring fluid flowing through the preset fracture model reaches a preset flow, so as to compress the preset fracture model into the evaluation model at a micro-nano level.

Wherein the controlling device 30 can be a general-purpose processor, a special-purpose processor, a conventional processor, a digital signal processor (DSP), a plurality of microprocessors, one or more microprocessors associated with DSP core, a controller, a microcontroller, an application specific integrated circuit (ASIC), a field programmable gate array (FPGA) circuit, any other type of integrated circuits (IC), a state machine, or the like.

Preferably, the system further comprises: a first permeability determining device (not shown), for determining an average permeability of the evaluation model for specific drilling fluid containing a specific plugging material when the preset fracture model is the single-connected fracture model, according to a Darcy formula, a Poiseuille's plate flow infinitesimal analysis formula, and the preset flow; or a second permeability determining device (not shown), for determining an average permeability of the evaluation model for specific drilling fluid containing a specific plugging material according to a Darcy formula and the preset flow when the preset fracture model is the multi-connected fracture model.

Preferably, the method further comprises: a size determining device (not shown), for determining the size of a fracture in the single-connected fracture model according to a Poiseuille's plate flow infinitesimal analysis formula and the preset flow when the preset fracture model is the single-connected fracture model.

Preferably, a material of the preset fracture model is at least one of glass fiber reinforced polyamide, acrylonitrile-butadiene-styrene copolymer, and thermoplastic polyurethane.

Preferably, the system further comprises: a confining pressure obtaining device (not shown), for determining a confining pressure when increasing the confining pressure is stopped as a confining pressure threshold; and a storing device (not shown), for storing the confining pressure threshold.

Wherein, the storing device (not shown) may comprise a volatile memory, a random access memory (RAM), and/or a non-volatile memory and other forms in a machine readable storage medium, e.g. a read only memory (ROM) or a flash memory (flash RAM). The memory can be an example of the machine readable storage medium.

The specific details and advantages of the system for obtaining an evaluation model provided by the invention, may refer to the above description about the method for obtaining an evaluation model. No more description is made herein.

Figure 4:
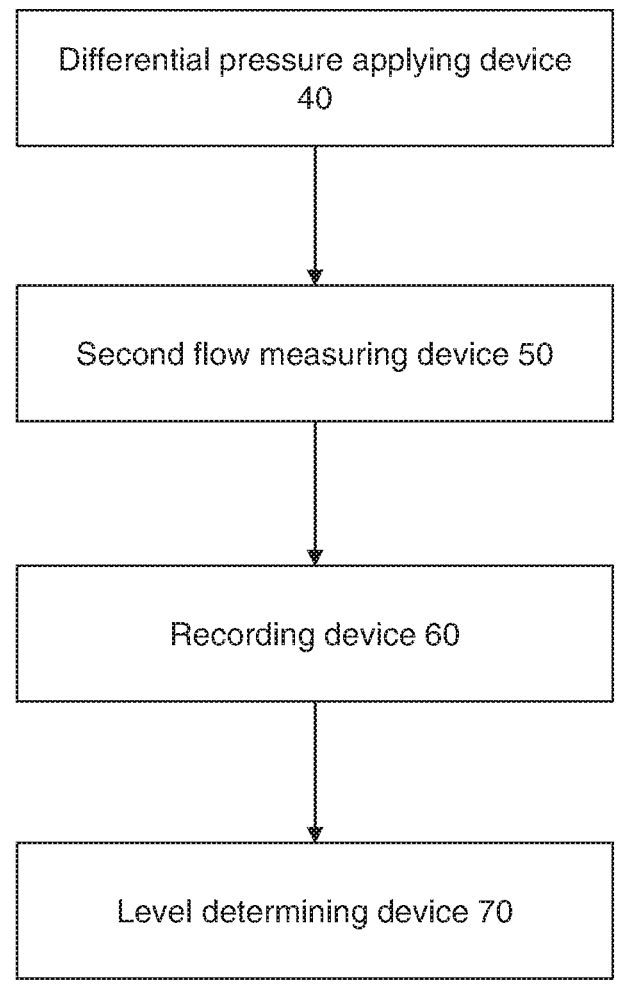
FIG. 4 is a structure diagram of an evaluation system for the plugging performance of drilling fluid provided by one embodiment of the invention.

FIG. 4 is a structure diagram of a system for evaluation of the plugging performance of drilling fluid provided by one embodiment of the invention. As shown in FIG. 4, the evaluation system can comprise: a differential pressure applying device 40, for applying a displacement differential pressure to two ends of a holding device where a preset fracture model is located when the confining pressure threshold obtained according to the system for obtaining the evaluation model is applied to the holding device; a second flow measuring device 50, for measuring the flow of specific drilling fluid flowing through the preset fracture model under different displacement differential pressures, wherein the different displacement differential pressures gradually increase according to a second preset rule, and the specific drilling fluid contains a specific plugging material; a recording device 60, for recording the current displacement differential pressure when the flow of the specific drilling fluid flowing through the preset fracture model exceeds a preset flow increment; and a level determining device 70, for comparing the current displacement differential pressure with displacement differential pressure threshold corresponding to the specific drilling fluid having different levels of plugging performance to determine the plugging level of the specific drilling fluid.

The specific details and advantages of the system for evaluation of the plugging performance of drilling fluid provided by the invention may refer to the above description about the method for evaluating the plugging performance of drilling fluid.

The preferred embodiments of the invention are described in detail above in combination with the accompanying drawings. However, the invention is not restricted to the specific details in the above embodiments. In the scope of the technical conception of the invention, various simple variations can be made to the technical solution of the invention and these simple variations belong to the protection scope of the invention.

In addition, it should be noted that the specific technical features described in the above specific embodiments can be combined in any suitable manner without contradiction. In order to avoid unnecessary repetition, the invention does not make additional description to various possible combinations.

In addition, various different embodiments of the invention can also be combined randomly therebetween, as long as the combination does not go against the conception of the invention, such that it should be deemed as the content disclosed in the invention similarly.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description but rather by the claims appended hereto.

What is claimed is:

1. A method for obtaining an evaluation model, the method comprising:
   applying a confining pressure to a holding device where a preset fracture model is located, wherein a displacement differential pressure of two ends of the holding device is a preset displacement differential pressure;
   measuring a flow of standard measuring fluid flowing through the preset fracture model under different confining pressures, wherein the different confining pressures gradually increase according to a first preset rule; and
   controlling to stop increasing the confining pressure when the flow of the standard measuring fluid flowing through the preset fracture model reaches a preset flow so as to compress the preset fracture model into the evaluation model at a micro-nano level.

2. The method for obtaining the evaluation model according to claim 1, wherein the preset fracture model is obtained by the following steps:
   establishing a three-dimensional model of a cylinder having a connected fracture;
   compiling the three-dimensional model; and
   performing 3D printing on the compiled three-dimensional model to obtain the preset fracture model.

3. The method for obtaining the evaluation model according to claim 1, wherein the preset fracture model is a single-connected fracture model or a multi-connected fracture model.

4. The method for obtaining the evaluation model according to claim 3, wherein the method further comprises:
   determining an average permeability of the evaluation model for specific drilling fluid containing a specific plugging material according to a Darcy formula, a Poiseuille's plate flow infinitesimal analysis formula, and the preset flow when the preset fracture model is the single-connected fracture model.

5. The method for obtaining the evaluation model according to claim 3, wherein the method further comprises:
   determining an average permeability of the evaluation model for specific drilling fluid containing a specific plugging material according to a Darcy formula and the preset flow when the preset fracture model is the multi-connected fracture model.

6. The method for obtaining the evaluation model according to claim 3, wherein the method further comprises:
   determining the size of a fracture in the single-connected fracture model according to a Poiseuille's plate flow infinitesimal analysis formula and the preset flow when the preset fracture model is the single-connected fracture model.

7. An evaluation method for the plugging performance of drilling fluid, wherein the evaluation method comprises:
   applying a displacement differential pressure to two ends of a holding device where a preset fracture model is located, when a confining pressure threshold obtained according to the method for obtaining the evaluation model according to claim 6 is applied to the holding device;

measuring a flow of specific drilling fluid flowing through the preset fracture model under different displacement differential pressures, wherein the different displacement differential pressures gradually increase according to a second preset rule, and the specific drilling fluid contains a specific plugging material;

recording a current displacement differential pressure when the flow of the specific drilling fluid flowing through the preset fracture model exceeds a preset flow increment; and comparing the current displacement differential pressure with displacement differential pressure thresholds corresponding to the specific drilling fluid having different levels of plugging performance to determine the plugging level of the drilling fluid.

8. The evaluation method for the plugging performance of drilling fluid according to claim 7, wherein the different displacement differential pressures gradually increase according to a second preset rule, comprising: the different displacement differential pressures gradually increase according to a preset displacement differential pressure increment.

9. The method for obtaining the evaluation model according to claim 1, wherein the method further comprises:

determining a confining pressure when the increasing the confining pressure is stopped as a confining pressure threshold; and storing the confining pressure threshold.

10. The method for obtaining the evaluation model according to claim 1, wherein a material of the preset fracture model comprises at least one of glass fiber reinforced polyamide, acrylonitrile-butadiene-styrene copolymer, and thermoplastic polyurethane.

11. A system for obtaining an evaluation model, wherein the system comprises:

a confining pressure applying device, for applying a confining pressure to a holding device where a preset fracture model is located, wherein a displacement differential pressure of two ends of the holding device is a preset displacement differential pressure;

a first flow measuring device, for measuring a flow of standard measuring fluid flowing through the preset fracture model under different confining pressures, wherein the different confining pressures gradually increase according to a first preset rule; and a controlling device, for controlling to stop increasing the confining pressure when the flow of the standard measuring fluid flowing through the preset fracture model reaches a preset flow so as to compress the preset fracture model into the evaluation model at a micro-nano level.

* * * * *